United States Patent [19]

Titmas et al.

[11] Patent Number: 5,026,209
[45] Date of Patent: Jun. 25, 1991

[54] CONTAINMENT CASING FOR A DEEP WELL GRAVITY PRESSURE REACTOR VESSEL

[75] Inventors: James A. Titmas, Kent; Robert A. Saffian, Akron, both of Ohio

[73] Assignee: Eau-Viron Incorporated, Hudson, Ohio

[21] Appl. No.: 389,639

[22] Filed: Aug. 4, 1989

[51] Int. Cl.⁵ .................. E21B 36/00; E21B 43/24
[52] U.S. Cl. .................. 405/133; 138/105; 166/57; 166/242; 166/303
[58] Field of Search .......... 405/133; 138/98, 105, 138/121; 285/226, 300; 166/57, 242, 303, 901, 256, 302

[56] References Cited

U.S. PATENT DOCUMENTS

| | | | |
|---|---|---|---|
| 1,565,254 | 12/1925 | Bystrom | 285/226 X |
| 2,057,176 | 10/1936 | Willenberg | 138/105 |
| 2,666,657 | 1/1954 | Howard et al. | 285/206 |
| 2,713,503 | 7/1955 | Ekholm | 285/92 |
| 2,867,242 | 1/1959 | Harris et al. | 138/121 X |
| 3,232,638 | 2/1966 | Hollander | 285/55 |
| 3,549,176 | 12/1970 | Contreras | 285/55 |
| 3,837,685 | 9/1974 | Miller | 285/300 X |
| 3,853,759 | 12/1974 | Titmas | 210/63 |
| 4,315,558 | 2/1982 | Katayama | 138/12 X |
| 4,350,372 | 9/1982 | Logsdon | 285/45 |
| 4,526,409 | 7/1985 | Schaefer | 285/114 |
| 4,637,637 | 1/1987 | Adorjan | 138/121 X |
| 4,792,161 | 12/1988 | Usui | 285/45 |
| 4,792,408 | 12/1988 | Titmas | 210/747 |

FOREIGN PATENT DOCUMENTS 282092  9/1988  European Pat. Off. ............ 166/57

Primary Examiner—Dennis L. Taylor
Assistant Examiner—John A. Ricci
Attorney, Agent, or Firm—Renner, Kenner, Greive, Bobak, Taylor & Weber

[57] ABSTRACT

A containment casing (10) for a deep well/gravity pressure reactor vessel includes a plurality of casing sections (11) each having a wall portion (20) with corrugations (21). An inner liner (24) and an exterior liner (25) prevent grout material (13) from entering the corrugations (21) during installation. Additionally, inner liner (24) is capable of supporting the hanging weight of the casing sections (11), and yet is susceptible to failure due to stresses induced by thermal fluctuations. The corrugations (21) allow for thermal expansion without a buildup of compression stresses and further allow for angular deviations of the casing (10).

5 Claims, 1 Drawing Sheet

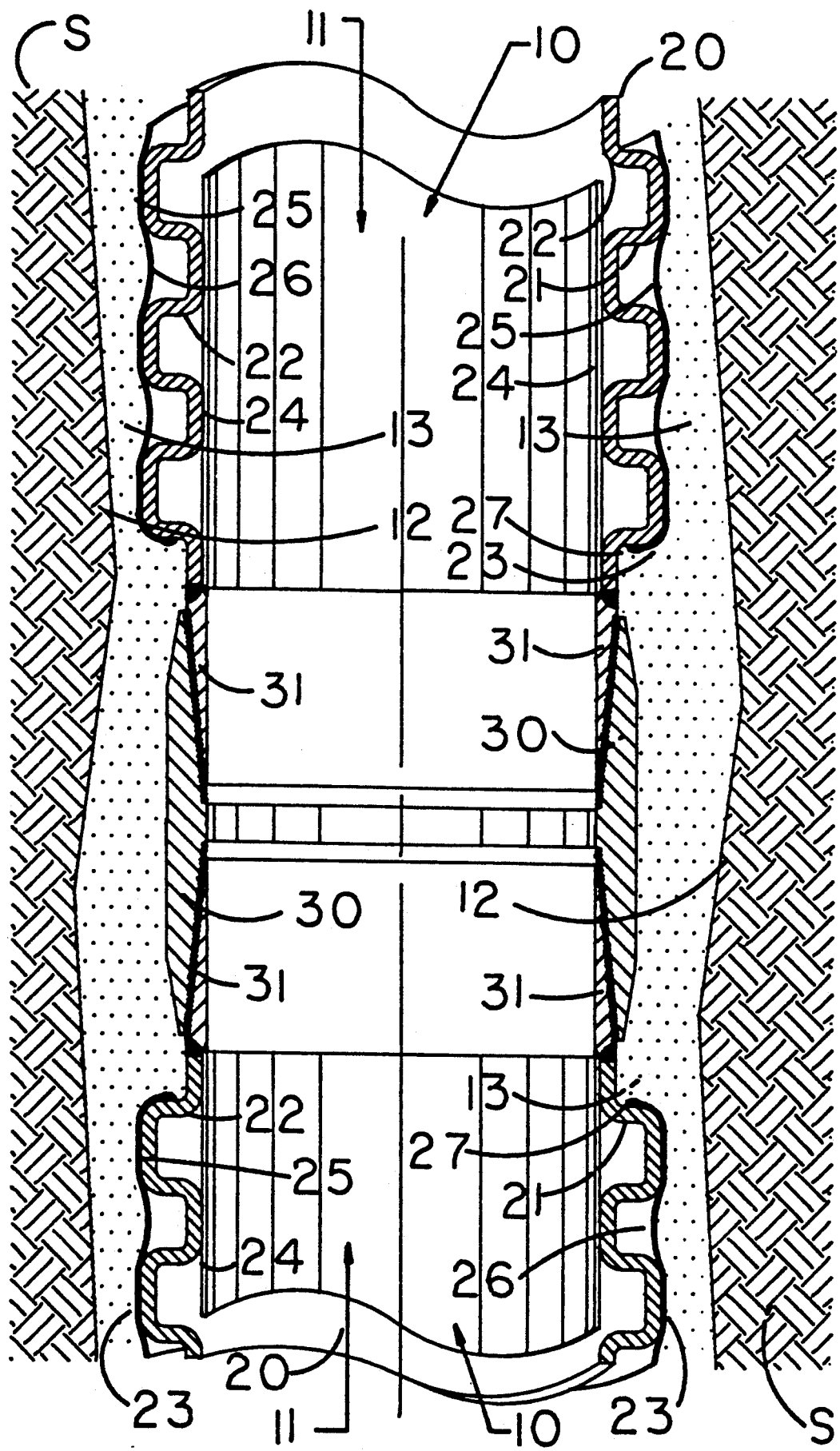

CONTAINMENT CASING FOR A DEEP WELL GRAVITY PRESSURE REACTOR VESSEL

TECHNICAL FIELD

The present invention is generally directed toward casings for deep well or gravity pressure reactor vessels. More particularly, the present invention is directed toward a reactor casing which will not readily fail when exposed to the divergent temperature fluctuations encountered in gravity pressure reactor vessels and which is likewise capable of enhanced angular deformation.

BACKGROUND ART

It is known in the art to improve certain chemical reaction kinetics by increasing the pressure and temperature at which the reaction is conducted. One method of achieving the desired conditions has been to provide a deep well hydraulic column or gravity pressure reactor vessel such as disclosed in U.S. Pat. Nos. 3,853,759 and 4,792,408.

Such gravity pressure reactors often comprise a lengthy passageway or column, positioned inside a bore which has been excavated in the strata of the earth. It has been known to house the reactor in an outer casing which is then grouted in place in the bore. This outer casing serves to protect the reactor column from being affected by the surrounding strata, which often contains mineral rich fluids which may be detrimental to the reaction and/or corrosive to the reactor column. Further, the grouting material serves to prevent intermixing of fluids from different stratum and protect the casing from these fluids, as well as acting to prevent heat losses from the apparatus.

It is also known in the art to grout containment casings in place by first introducing grout material into the interior of the casings. A plug is then placed over the grout material and water is pumped behind the plug, such that the water pressure causes the plug to travel downwardly through the casing, pushing the grout material ahead. At the bottom of the casing, the grout material is forced through an open valve and encounters the earth strata and is forced to travel back upwardly along the exterior of the casing, that is, between the casing and the strata, toward the upper end of the casing where the grout material was introduced. The material is then allowed to set, and thereby provides support for the casing.

As disclosed in U.S. Pat. No. 4,792,408, supercritical water temperatures and pressures are often attained in gravity pressure reactors. During routine operations, the temperatures in the reactors often cycle by as much as 900° F. Temperature fluctuations in this range induce compression stresses in the casings as they are caused to expand and yet are restrained by the grouting and the surrounding strata. For example, it has been found that for every 12° F. rise in casing temperature, a unit stress of 2,430 lbs/in$^2$ is induced into the casing. If the casing has a maximum working stress of 100,000 lbs/in$^2$, the maximum service temperature would be 512° F.; however, modern gravity pressure reactors have peak service temperatures of 900° F. Thus, the compression stresses are likely to exceed the yield strength of the casing material, rendering the casing subject to tension failure when it is cooled for servicing.

Previous attempts at compensating for thermally induced compression stresses in gravity pressure reactor casings have included pre-stressing the casings. This procedure involves anchoring the bottom of the casing, such as by concrete, and exerting a pulling force at the top of the casing, such as by hoists or jacks. As an example, a 400,000 pound casing may require 300,000 pounds of pretension. Thus, a total of 700,000 pounds of lifting force would be required at the top of the casing. Then as such a pre-stressed casing cycles between the divergent temperature ranges, relative degrees of pre-tension would be relaxed and the casing would remain within working stress ranges. However, in addition to requiring such a large amount of lifting force, a further drawback to such a procedure is that the maximum pre-tension is achieved at the top of the reactor casing. The greater need for pre-tensioning is at the bottom of the casing where the temperature fluctuations are the greatest. An additional complication with pre-tensioned casings is that the surrounding strata itself will often expand under the influence of thermal fluctuations. When this occurs, additional tension may be directed to the casing.

It has not proven to be a solution to increase the thickness of the casings. Very deep reactors of over 12,000 feet have limitations in collapse pressures arising from the hydraulic head produced by unset grout on the outside of the casing. If the walls are too thick, then the temperatures on either side of the casing will be great enough to cause internal stresses in the casing walls.

Another drawback to making the casing walls thicker is that the thicker the wall, the more rigid the casing tends to be. This is a problem in that bore holes in the earth strata are not uniform, and often have slight lateral fluctuations. A slight fluctuation extended over miles in length causes a great overall deviation. If the reactor casings are not tolerant of these fluctuations, then they will not be securely positionable inside the bore.

Thus, a need exists for a gravity pressure reactor vessel casing which is flexible enough to compensate for variations in bore dimensions, and which is further capable of compensating for thermal expansion.

DISCLOSURE OF THE INVENTION

It is therefore a primary object of the present invention to provide a novel casing for a deep well, gravity pressure reactor vessel.

It is another object of the present invention to provide a casing, as above, which is capable of compensating for compression stresses encountered due to the effects of thermal expansion.

It is a further object of the present invention to provide a casing, as above, which has angular flexibility so as to compensate for lateral deviations of the bore in the earth strata.

It is an additional object of the present invention to provide a casing, as above, which includes a center wall and inner and outer liners forming an overall casing of veneer construction.

It is yet another object of the present invention to provide a casing, as above, whereby the center wall, the inner liner and the outer liner can be constructed of differing materials thereby making more efficient use of expensive materials having specific desired qualities.

These and other objects of the present invention, as well as the advantages thereof over existing art forms, which will become apparent in view of the following specification, are accomplished by means hereinafter described and claimed.

In general, a containment casing for a gravity pressure reactor vessel is positioned in a bore in the earth and grouted in place. The casing has a corrugated wall portion with an interior and an exterior side. The casing has an inner liner which is supported by the interior side of the wall portion, and an outer liner supported by the grouting material.

BRIEF DESCRIPTION OF THE DRAWINGS

The figure is a vertical section showing portions of two containment casing sections positioned in a bore hole.

PREFERRED EMBODIMENT FOR CARRYING OUT THE INVENTION

A portion of a containment casing for a deep well or gravity pressure reactor vessel embodying the concepts of the present invention is generally indicated by the numeral 10 in the drawing. Casing 10 includes a plurality of casing sections generally indicated by the numeral 11 which may be added one to the other in order to obtain any length of casing 10 required. Casing 10 represents the outer casing of a reactor vessel which usually includes a plurality of concentric hydraulic columns within casing 10 as shown in U.S. Pat. Nos. 3,853,759 and 4,792,408 to which reference is made for whatever details are necessary to understand the present invention and the environment thereof. Casing 10 is placed in a bore 12 in the earth and houses the reactor vessel within the surrounding strata "S".

As is known in the art, casing 10 is shown as being positioned in bore 12 and grouted in place by grout material 13. This serves to prevent fluids from the surrounding strata S from interfering with the reaction taking place inside the reactor vessel. These fluids may be fresh water, salt water, oils and the like, and may even include different gases. Such mixtures may prove to be detrimental to the reaction, or they may prove to be corrosive to the reactor vessel and/or casing 10. Moreover, grout 13 also serves to reduce heat losses from the apparatus to the surrounding strata S.

Each casing section 11 of casing 10 includes a wall portion generally indicated by the numeral 20, which has corrugations 21, an interior side 22 and an exterior side 23. Because wall portion 20 has corrugations 21, it is capable of absorbing compression stresses such as may be introduced when casing 10 is caused to expand under the influence of thermal fluctuations. When the reactor is caused to be heated to temperatures as high as 900° F., as often encountered during normal operations, the corrugated nature of the wall portion 20 allows compensation for the attendant thermal expansion.

The corrugations 21 in wall portion 20 also provide for angular deviations in a section 11 of casing 10, such as may be necessary if bore 12 is not perfectly excavated. Thus, lateral deviations in bore 12 may be accommodated by bending of wall portion 20, which is possible due to corrugations 21.

In order to retain maximum efficiency of both compensating for thermal expansion and for allowing for lateral deviations in casing 10, it is desirable to prevent the grout material 13 from entering or intruding into the corrugations 21 of wall portion 20. If the grout material 13 would be permitted to enter the corrugations 21, then normal expansion or contraction of the corrugation would be prohibited, and compression stresses would again be encountered. As described above, during the grouting of the casing 10, grout material 13 is first forced along the interior wall 22 of casing 10 and then finds its final resting place along the exterior wall 23 of casing 10. Thus, it is necessary to prevent grout material 13 from entering the corrugations 21 on both sides 22 and 23 of the casing 10.

To that end an inner liner 24 is provided and is supported by the interior side 22 of the casing 10. Inner liner 24 is of a thin-walled material which is strong enough to hold the hanging weight of the casing 10 during installation, and yet is thin enough that it can buckle and fail once exposed to high temperatures and then cooled. A wall thickness of ⅛ inch with a diameter of 16 inches is sufficient to support a casing weighing approximately 600,000 pounds, but has virtually no compression strength and thereby will eventually fail.

Thus, a plurality of casing sections 11 may be placed one on top of the other in a bore 13, supported only by the strength of the inner liner 24. As the grouting material 13 is forced through the interior of the casing 10, the corrugations 21 are kept free of such material. As the reactor is later placed into operation and the divergent temperature cycles are encountered, inner liner 24 will buckle and ultimately fail. Of course, by this time, grouting material 13 has been allowed to set, providing support for the casing 10. Without inner liner 24 the corrugations 21 are thus free to flex as required.

Similarly, an exterior liner 25 is provided on the exterior side 23 of the casing 10. Grout material 13 is thus prevented from engaging corrugations 21 as the material fills the space between the casing 10 and the strata S. Exterior liner 25 is preferably resistant to erosion and degradation caused by contact with fluids in strata S (water, oil and the like) and with the grout material. However, once the grout material 13 has set, it will not flow into the corrugations 21 should the exterior liner 25 fail. If failure does occur, the reactor is still protected by wall portion 20.

Exterior liner 25 is preferably thin walled and is fabricated so as to conform somewhat with the exterior side 23 of the casing 10. The exterior liner 25 does not conform so as to mimic the corrugations 21, but is configured with slight indentations 26 at corrugations 21. Indentations 26 enhance the seal, preventing strata fluids from intermingling by creating ring-like barriers at corrugations 21. However, should the exterior liner fail after the grout has set it is of no additional consequence to the system.

If necessary to provide enhanced structural support of exterior liner 25 an inert filler material (not shown) could be positioned between exterior liner 25 and wall portion 20 thereby filling the space between corrugations 21 and liner 25. Similarly, such an inert filler could be positioned between corrugations 21 and inner liner 24. Such would prevent a premature failure of the inner liner 24 or exterior liner 25.

The plurality of casing sections 11 may be joined as by a conventional coupling ring 30. Coupling ring 30 threadably engages threaded upper and lower portions 31 of each casing section 11 so as to form casing 10. Such coupling represents only one method of coupling a plurality of casing sections 11. Other methods, which are generally known in the art, could be used without departing from the spirit of this invention.

With casing 10 in place the reactor vessel can be lowered within casing 10 concentrically spaced from inner liner 24. The reactor vessel can then operate as described, for example, in U.S. Pat. Nos. 3,853,759 and 4,792,408. The heat generated by the chemical reactions in the reactor vessel is better contained than the prior art due to the fact that casing 10 includes the three wall lamination or veneer, that is, it includes center wall 20, inner liner 24 and exterior liner 25 to better control convective heat losses. In addition, the inside face of inner liner 24 may be calorized with aluminum or other material of high emissivity to reduce radiant heat losses.

Although the specific materials for the center corrugated wall 20, inner liner 24 and exterior liner 25 are not critical to the invention, as previously indicated the veneer construction permits a choice of materials such that a more economically constructed casing can be provided. For example, only the thin exterior liner 25 need be constructed of a material which is highly resistive to the corrosive attack of the heated grout 13 and fluids from strata S. The thicker corrugated center wall 20 thus can be constructed of a much less expensive material such as high strength steel. Likewise, the thin inner liner 24 may be constructed of a material of high emissivity of more expense than wall 20.

Thus it should be evident that a gravity pressure reactor vessel casing embodying the concepts of the invention disclosed herein carries out the various objects of the invention and otherwise constitutes an advantageous contribution to the art.

We claim:

1. A containment casing for a gravity pressure reactor vessel wherein the casing is positioned inn a bore in the earth and held in place by a grouting material, the casing comprising a plurality of casing sections each including a wall portion having an interior and an exterior side, said wall portion having corrugations therein, an inner liner attached to the interior side of said wall portion, and an outer liner on said wall portion between said exterior wall and the grouting material, sad inner liner not intruding into said corrugations, said outer liner including indentations extending slightly into said corrugations in said wall portion.

2. A containment casing as in claim 1 wherein said inner liner has a hanging strength sufficient to bear the weight of the containment casing during installation of the casing.

3. A containment casing as in claim 2, wherein said inner liner is susceptible to fracture failures under the influence of thermal fluctuations.

4. A containment casing as in claim 1, wherein each casing section further includes upper and lower threaded ends.

5. A containment casing as in claim 4, further comprising a threaded coupling ring threadably engaging said threaded ends of adjacent casing sections joining said adjacent casing sections together.

* * * * *